Feb. 10, 1931.     F. D. KING     1,792,309
CONTROL SYSTEM
Filed April 9, 1930
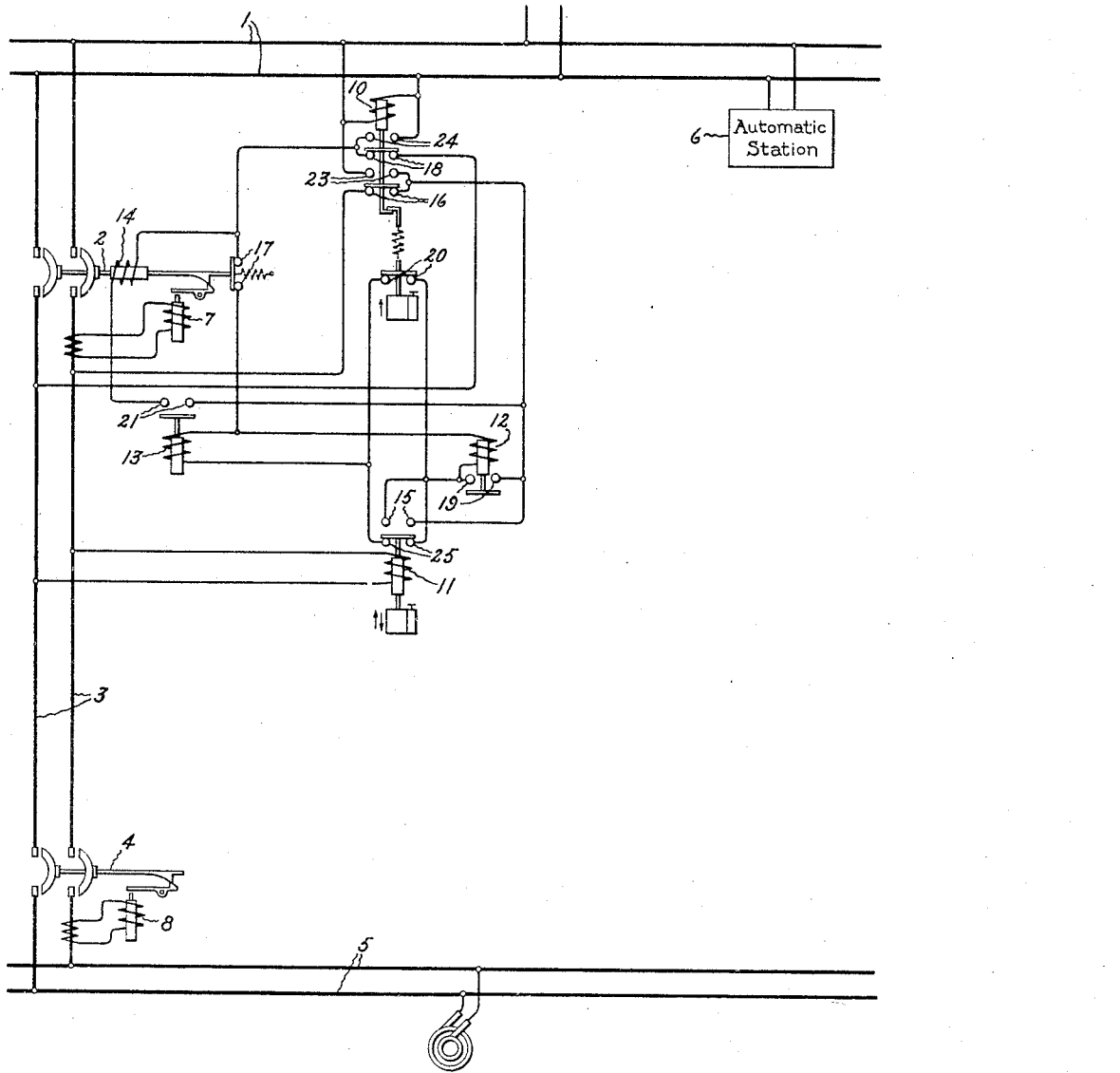
Inventor:
Frederic D. King,
by Charles E. Tullar
His Attorney.

Patented Feb. 10, 1931

1,792,309

UNITED STATES PATENT OFFICE

FREDERIC D. KING, OF BROOKLINE, PENNSYLVANIA, ASSIGNOR TO GENERAL ELECTRIC COMPANY, A CORPORATION OF NEW YORK

CONTROL SYSTEM

Application filed April 9, 1930. Serial No. 442,957.

My invention relates to remote control systems and particularly to systems for remotely controlling the closing of a circuit breaker in an electric circuit and one of its objects is to provide an improved arrangement for accomplishing this result without using pilot or other control wires between the controlling and controlled points.

Another object of my invention is to provide an improvement in the control system disclosed and claimed in Letters Patent 1,717,264 to William H. Rowney, assignor to the assignee of this application whereby the closing of a circuit breaker between a feeder circuit and another electric circuit which may be energized at some other point is effected in response to the energization of the feeder circuit when the other circuit is deenergized and only in response to the energization and subsequent deenergization of the feeder circuit when the feeder circuit is deenergized and the other circuit is energized.

My invention will be better understood from the following description when taken in connection with the accompanying drawing and its scope will be pointed out in the appended claims.

Referring to the accompanying drawing, the single figure of which diagrammatically shows an electric system embodying my invention, 1 represents an electric circuit, such as a load circuit, which is arranged to be connected by a suitable switch 2 to a supply circuit, such as a transmission line 3, which at another point is connected by a suitable switch 4 to a source of current such as a generator bus 5. In order that the load circuit 1 may be supplied with current in case the transmission line or its source fails, the load circuit 1 may also be supplied with current from another source of current such, for example, as an automatic station 6 which is arranged in any suitable manner so that it is placed in operation in response to the energization of the load circuit 1 and remains in operation under normal conditions until the current output of the automatic station remains below a predetermined value for a predetermined time. Since the details of the automatic station 6 do not constitute a part of my present invention and furthermore these details are well known in the art, I have deemed it advisable not to complicate the disclosure of my present invention by showing these details.

In case of a fault on the transmission line 3, it is desirable to disconnect the line from the load circuit 1 and the generator bus 5 and, therefore, the switches 2 and 4 are respectively provided with suitable tripping means 7 and 8 for effecting the opening of the respective circuit breaker in response to a predetermined abnormally large current.

After the switches 2 and 4 have been opened and the fault on the transmission line 3 has been removed, it is desirable to have the switch 2 so arranged that the reenergization of the transmission line 3 by the closing of the switch 4 effects the immediate reclosing of the switch if the load circuit 1 is not energized. If, however, the load circuit 1 is being supplied with current from the automatic station 6, it is not desirable to effect the immediate reclosure of the switch 2 in response to the reenergization of the transmission line 3 because the source connected to the generator bus 5 may not be in synchronism with the automatic station 6. Therefore, in accordance with my invention, the control apparatus associated with the switch 2 is arranged so that if the load circuit 1 is energized when the line 3 is reenergized, the switch 2 cannot close until the switch 4 is subsequently opened to effect the deenergization of the line 3. Therefore, when the switch 2 closes, the switch 4 is open so that the operator at the controlling point can effect the reclosing of the switch 4 when the source in the automatic station 6 and the source connected to the generator bus 5 are in synchronism.

In the embodiment of my invention shown in the drawing for accomplishing these results, the control arrangement associated with the switch 2 includes two voltage relays 10 and 11 which are respectively responsive to the voltages of the load circuit 1 and the transmission line 3 and a control relay 12 which is arranged to be energized when the voltage of the transmission line is above a predetermined value and which, when energized, completes a locking circuit for its winding so that the relay remains in its energized position when the line 3 is subsequently deenergized. The relays 10, 11, 12 are arranged so that if either the voltage relay 10 or the voltage relay 11 is deenergized while the control relay 12 is energized and the switch 2 is open, an energizing circuit is completed for a control relay 13 to effect the energization of the closing coil 14 to close the switch 2. If the relay 10 is deenergized, thereby indicating that the load circuit 1 is deenergized, the energizing circuits for the control relay 13 and the closing coil 14 are connected by the relays 10 and 12 across the energized transmission line 3. If, however, the relay 10 is energized, thereby indicating that the load circuit 1 is energized, the energizing circuits for the control relay 13 and the closing coil 14 are completed by the relays 11 and 12 across the energized load circuit 1 since the relays 13 and 14 are energized to effect the closing of the switch 2 at a time when the transmission line 3 is deenergized.

The operation of the arrangement shown in the drawing is as follows:

When the circuit breakers 2 and 4 are open and the automatic station 6 is shut down, the various devices associated with the circuit breaker 2 are in the positions shown in the drawing. When it is desired to close the switch 2 so as to connect the generator bus 5 to the load circuit 1, the circuit breaker 4 is closed in any suitable manner. The voltage impressed across the transmission line 3 by the closing of the switch 4 causes the voltage relay 11 to close its contacts 15 after the transmission line voltage remains above a predetermined value for a predetermined time. The closing of the contacts 15 of the relay 11 completes an energizing circuit for the control relay 12. This circuit is from one side of the transmission line 3 through the contacts 16 of the deenergized voltage relay 10, contacts 15 of the energized voltage relay 11, winding of relay 12, auxiliary contacts 17 on the open switch 2, contacts 18 of the deenergized voltage relay 10 to the other side of the transmission line 3. The relay 12, by closing its contacts 19, completes an energizing circuit for the control relay 13 which, in turn, completes an energizing circuit for the closing coil 14 to close the switch 2. The energizing circuit of the control relay 13 is from one side of the transmission line 3 through the contacts 16 of the deenergized voltage relay, contacts 19 of the energized control relay 12, contacts 20 of the deenergized voltage relay 10, winding of control relay 13, auxiliary contacts 17 on the open switch 2, contacts 18 of the deenergized voltage relay 10 to the other side of the transmission line 3. The energizing circuit for the closing coil 14 is from one side of the transmission line 3 through the contacts 16 of the deenergized voltage relay 10, contacts 21 of the energized control relay 13, closing coil 14, contacts 18 of the deenergized voltage relay 10 to the other side of the transmission line.

As soon as the switch 2 closes, normal voltage is impressed across the load circuit 1 so that the automatic station 6 is placed in operation. The opening of the auxiliary contacts 17 on the switch 2 when it closes effects the deenergization of the control relays 12 and 13. The auxiliary switch 17 is designed so that its contacts remain closed until the closing operation of switch 2 is so far advanced that it will be completed by the momentum of the closing mechanism. As soon as normal voltage is impressed across the load circuit 1, the voltage relay 10 operates to open its contacts 16 and 18 and to close its contacts 23 and 24 so that energizing circuit for the closing coil 14 is transferred to the load circuit 1, until opened by relay 13 in response to the opening of the auxiliary switch 17.

Let it be assumed now that while the switches 2 and 4 are closed and the automatic station 6 is in operation, a fault occurs on the transmission line 3 so that the tripping means 7 and 8 operate to effect the opening of the circuit breakers 2 and 4 respectively and that this fault does not effect the shutting down of the automatic station 6. Under these conditions, the load circuit 1 remains energized after the circuit breakers 2 and 4 open.

When the fault is removed and it is desired to reclose the circuit breaker 2, the switch 4 is reclosed so as to connect the transmission line 3 to the generator bus 5. As soon as the voltage relay 11 closes its contacts 15, a circuit is completed for the control relay 12. This circuit is from one side of the load circuit 1 through the contacts 23 of the energized relay 10, contacts 15 of the energized voltage relay 11, winding of control relay 12, auxiliary contacts 17 on the switch 2, contacts 24 on the energized voltage relay 10 to the other side of the load bus 1. The control relay 12 by closing its contacts 19 completes a locking circuit for its winding which is independent of the contacts 15 of the voltage relay 11. The closing of the contacts 19 of the relay 12, however, does not complete the above traced energizing circuit for the control relay 13 because the contacts 20 of the relay 10 are open.

After the switch 4 has been closed for a predetermined length of time, it is opened so as to effect the deenergization of the relay 11 which, after a predetermined time, closes its contacts 25 which are connected in shunt circuit around the contacts 20 of the voltage relay 10. The closing of the contacts 25 completes an energizing circuit for the control relay 13. This circuit is from one side of the load circuit 1 through the contacts 23 of the energized voltage relay 10, contacts 19 of the control relay 12, contacts 25 of the deenergized voltage relay 11, winding of control relay 13, auxiliary contacts 17 on the switch 2, contacts 24 of the energized voltage relay 10 to the other side of the load circuit 1. The closing of the contacts 21 of the control relay 13 completes the above traced circuit of the closing coil 14 so that the switch 2 closes to connect the deenergized transmission line 3 to the energized load circuit 1. The switch 4 is then closed in any suitable manner when the source connected to the transmission line 3 and the generator bus 5 are in synchronism.

It will be observed by means of my improved arrangement that the switch 2 closes immediately after the transmission line 3 is energized by the closing of the switch 4 if the load circuit 1 is deenergized when the transmission line is reenergized and that if the load circuit 1 is energized at the instant the transmission line 3 is reenergized, it is necessary to again deenergize the transmission line for a short time in order to effect the closing of the switch 2.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:—

1. In combination, two electric circuits, means for energizing each circuit, and means for connecting said circuits together in response to the energization of one of said circuits when both of said circuits are deenergized and only in response to the energization and subsequent deenergization of said one of said circuits when said other circuit is energized and said one of said circuits is energized.

2. In combination, a load circuit, means for energizing said circuit, a supply feeder, means for energizing said feeder, a switch for connecting said feeder to said circuit, and means for closing said switch in response to the energization of said feeder when said load circuit is deenergized and for closing said switch only in response to the energization and subsequent deenergization of said feeder when said circuit is energized and said feeder is deenergized.

3. In combination, a load circuit, a source of current for supplying current to said circuit, a transmission line, a second source of current for said line, a switch for connecting said line to said circuit, a second switch for connecting said second source to said line, and means for effecting the closing of said second switch in response to the energization of said line when said first mentioned switch is closed while said first mentioned source is not supplying current to said circuit and for effecting the closing of said second switch when said load circuit is being supplied with current from said first mentioned source only in response to the closing and subsequent opening of said second switch whereby said first mentioned switch is closed while said second switch is open.

4. In combination, a load circuit, an automatic station arranged to be started and connected to circuit in response to the voltage thereof, a transmission line, a source of current for said line, a switch for connecting said line to said circuit, a second switch for connecting said second source to said line, means for effecting the opening of said switches in response to predetermined abnormal conditions on said line, and means for effecting the closing of said second switch in response to the energization of said line when said first mentioned switch is closed when said automatic station is shut down and for effecting the closing of said second switch when said automatic station is in operation and supplying current to said load circuit while said line is deenergized only in response to the closing and subsequent opening of said second switch whereby said first mentioned switch is closed while said second switch is open.

5. In combination, two electric circuits, a switch for connecting said circuits together, electroresponsive means arranged when energized to effect the closing of said switch, a circuit for said electroresponsive means, contacts in said last mentioned circuit, means responsive to the voltage of one of said electric circuits for closing certain of said contacts when the voltage of said one of said electric circuits is above a predetermined value, means for closing other of said contacts when said one of said electric circuits is subsequently deenergized, and means responsive to the voltage of the other electric circuit for completing a short circuit around said other of said contacts when said other electric circuit is deenergized.

6. In combination, two electric circuits, a switch for connecting said circuits together, electroresponsive means arranged when energized to effect the closing of said switch, a circuit for said electroresponsive means, contacts in said last mentioned circuit, means responsive to the voltage of one of said electric circuits for closing certain of said contacts when the voltage of said one of said electric circuits is above a predetermined value, means for closing other of said contacts when said one of said electric circuits is subsequently deenergized, and means responsive to the voltage of the other electric circuit for completing a short circuit around said other of said contacts and for connecting said circuit for said electroresponsive means across said one of said electric circuits when said other electric circuit is deenergized and for connecting said circuit for said electroresponsive means across said other electric circuit when the voltage thereof is above a predetermined value.

7. In combination, two electric circuits, a switch for connecting said circuits together, electroresponsive means arranged when energized to effect the closing of said switch, means for connecting said electroresponsive means across one of said electric circuits in response to the energization of said one of said electric circuits while the other electric circuit is deenergized, and means for connecting said electroresponsive means across the other of said electric circuits in response to the energization and subsequent deenergization of said one of said electric circuits when said other of said electric circuits is energized and said one of said electric circuits is deenergized.

In witness whereof, I have hereto set my hand this 7th day of April, 1930.

FREDERIC D. KING.